(No Model.)
G. M. PETERS.
BLASTING CARTRIDGE.
No. 422,441. Patented Mar. 4, 1890.
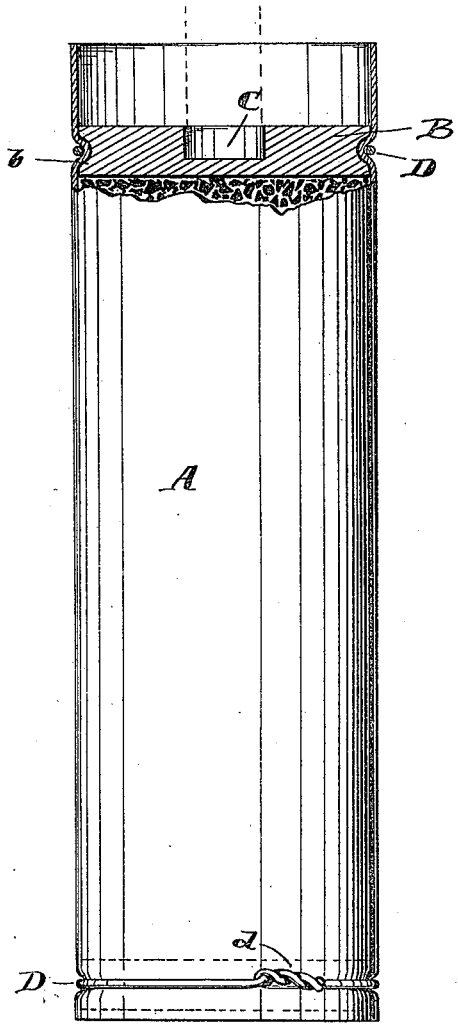
Attest
J. E. Peters
J. H. McKibben
Inventor
G. Moore Peters
By J. N. MacDonald
Atty.

UNITED STATES PATENT OFFICE.

GERSHOM MOORE PETERS, OF CINCINNATI, OHIO.

BLASTING-CARTRIDGE.

SPECIFICATION forming part of Letters Patent No. 422,441, dated March 4, 1890.

Application filed September 9, 1889. Serial No. 323,438. (No model.)

*To all whom it may concern:*

Be it known that I, GERSHOM MOORE PETERS, a citizen of the United States, and a resident of Cincinnati, in the county of Hamilton and State of Ohio, have invented certain new and useful Improvements in Blasting-Cartridges; and I do hereby declare the following to be a full, clear, and exact description of the invention, such as will enable others skilled in the art to which it appertains to make and use the same.

My invention relates to blasting-cartridges; and it consists in certain details of construction and arrangements of the several parts, as will be hereinafter more fully described in the specification, pointed out in the claims, and illustrated in the accompanying drawing, which is a side elevation of my device.

Referring more particularly to the drawing, A represents a tube, preferably of paper, rolled on a mandrel to any given or required size and rendered water-proof in any suitable way. The lower end of the tube is closed by a disk E, of wood cut crosswise of the grain, for reasons that will hereinafter be explained. The disk may, however, be made of lead or other suitable material. Centrally around the periphery of the disk a groove or channel $b$ is cut, and into which the shell is compressed by a wire D and fastened at $d$, as shown in the drawing. When the disk E is of wood or paper, it is preferably varnished or waterproofed. The ends of the wire $d$ are also pressed into the groove, and thus prevent catching or slipping. After the cartridge has been filled with powder to a certain extent the disk B is placed in position, also provided with the groove $b$, and is fastened in the same manner as the lower disk. The grain of the wooden disks runs preferably lengthwise with the cartridge, in order that they may be more readily turned and sawed off in proper thickness. This is also of benefit to the upper disk, as an opening for the blasting-barrel can be more readily made. To further aid the entrance of the blasting-barrel, a hole C may be and is preferably bored part way through the disk. The remaining portion or covering can be easily knocked out by a blunt tool or the blasting-barrel itself. The disk may, however, be thinned out in the center in the double-concaved form, as shown at F.

In order to make a water-tight connection, the groove $b$ is preferably coated with tar, and the wire D, as it is tightened, will then cause the tar to spread and fill every possible opening.

In order to hold packing about the blasting-barrel when desirable to shut out water, the tube may be extended a short distance above the disk B, as shown in the drawing.

Having thus described my invention, what I claim as new, and desire to secure by Letters Patent, is—

In a blasting-cartridge, the combination, with the shell, of a sealing-disk secured to the inside of the shell, said disk having a recess or pocket C for the reception of the blasting-barrel.

In witness whereof I have signed this specification in the presence of two subscribing witnesses.

G. MOORE PETERS.

Witnesses:
 J. H. McKIBBEN,
 O. E. PETERS.